(12) United States Patent
Lehnert et al.

(10) Patent No.: US 6,208,085 B1
(45) Date of Patent: Mar. 27, 2001

(54) CIRCUIT FOR POWER-FACTOR CORRECTION

(75) Inventors: Klaus Lehnert, Freital; Henry Gueldner, Heidenau; Franz Raiser, Munich, all of (DE)

(73) Assignee: Patent-Treuhand-Gesellschaft fuer elektrische Gluehlampen mbH, Munich (DE)

( * ) Notice: Subject to any disclaimer, the term of this patent is extended or adjusted under 35 U.S.C. 154(b) by 0 days.

(21) Appl. No.: 09/572,613

(22) Filed: May 17, 2000

(30) Foreign Application Priority Data

May 20, 1999 (DE) .............................. 199 23 238

(51) Int. Cl.$^7$ .................................. H05B 37/00
(52) U.S. Cl. .................. 315/247; 315/209 R; 315/224; 363/39; 363/40
(58) Field of Search .................. 315/209 R, 219, 315/224, DIG. 7, 246, 247; 363/39, 40

(56) References Cited

U.S. PATENT DOCUMENTS

| | | |
|---|---|---|
| 4,808,887 | 2/1989 | Fähnrich et al. ............... 315/247 |
| 5,008,597 | 4/1991 | Zuchtriegel ................... 315/209 R |
| 5,488,269 | 1/1996 | El-Hamamsy et al. ........... 315/307 |

*Primary Examiner*—David Vu
(74) *Attorney, Agent, or Firm*—Carlo S. Bessone

(57) ABSTRACT

The present invention relates to a circuit for power-factor correction having a bridge rectifier (18) with a first and a second input connection (14, 16) in which case an AC voltage source (10) can be arranged between the first and the second input connection (14, 16), and having a first and a second output connection (30, 32), an actuation and load circuit (24), at least one energy storage apparatus, (20; 20a; 20b), whose first connection is connected to a connection (28) in the actuation and load circuit (24), in which case the signal which can be tapped off at this connection (28) in operation is at a considerably higher frequency than the output signal from the AC voltage source (10), and an energy storage capacitor (CS), wherein the energy storage capacitor (CS) is arranged in parallel with the output connections (30, 32) of the bridge rectifier (18), and the second connection of the at least one energy storage apparatus (20; 20a; 20b) is connected to one of the two input connections (14; 16) of the bridge rectifier (18).

11 Claims, 12 Drawing Sheets

CIRCUIT FOR POWER-FACTOR CORRECTION

FIELD OF THE INVENTION

The present invention relates to a circuit for power-factor correction, to be precise to a circuit having a bridge rectifier with a first and a second input connection in which case an AC voltage source can be arranged between the first and the second input connection, and having a first and a second output connection, an actuation and load circuit, at least one energy storage apparatus, whose first connection is connected to a connection in the actuation and load circuit, in which case the signal which can be tapped off at this connection in operation is at a considerably higher frequency than the output signal from the AC voltage source, and an energy storage capacitor.

BACKGROUND OF THE INVENTION

Circuits for power-factor correction are also referred to as charge pumps or pump circuits. They are used, for example, to satisfy IEC Standard 1000-3-2, in which the electricity supply organizations have defined the acceptable mains current harmonics. It is therefore undesirable to draw high-frequency energy from the power supply network. The mains current which is drawn from the mains is, optimally, proportional to the mains voltage. Proportionality between the mains current and the mains voltage allows the maximum power transfer for any given cable size. Reactive currents which would occur if the mains voltage and the mains current were not proportional would cause cable losses, which place additional loads on the cables and thus leading to interference with other loads.

Such circuits for power-factor correction are used, inter alia, for ballasts for operation of gas-discharge lamps.

The present invention is based on a prior art as is known, for example, from EP-A-0 253 224, DE-A-38 41 227 or U.S. Pat. No. 5,488,269. The prior art in these documents is illustrated in the outline circuit in FIG. 1. In this circuit, an AC voltage source 10, in general the mains voltage, is connected to the inputs 14 and 16 of a rectifier 18 which comprises the four diodes DG1, DG2, DG3 and DG4.

First of all, reference will be made to the circuit arrangement illustrated by solid lines: an energy storage apparatus 20 is connected on the one hand to the junction point between two diodes DP1, DP2 and on the other hand at the connection 28 to a high-frequency voltage source 22, that is to say an AC voltage source which, in operation, provides a signal at a considerably higher frequency than the AC voltage source 10. This AC voltage source 22 is part of the actuation and load circuit 24, as is intended to be expressed by the double arrow 26. Arranged in parallel with the actuation and load circuit 24 is an energy storage capacitor CS, which is used to store the energy drawn from the AC voltage source 10 in order to supply the actuation and load circuit 24.

An alternative embodiment is shown by dashed lines in FIG. 1. This comprises an energy storage apparatus 20' which is connected on the one hand to the high-frequency voltage source 22 and on the other hand to the junction point between two diodes DP1', DP2'. The diodes DP2 and DP2' are used to prevent reactions from the actuation and load circuit 24 on the energy storage apparatus 20 or 20' respectively. The diodes, DP1, DP1', which are in the form of so-called "fast diodes" in comparison with the diodes DG1 to DG4 in the rectifier 18, are used to prevent energy from being pumped into the AC voltage source 10.

Taking account of the fact that such pump circuits are used, for example, in ballasts for operation of gas discharge lamps which are mass-produced items, the cost aspect is of major importance.

SUMMARY OF THE INVENTION

The present invention is therefore based on the object of providing a circuit for power-factor correction, that is to say a pump circuit, which, as has already been achieved by the prior art, likewise prevents reactions from the actuation and load circuit on the energy storage apparatus, as well as suppressing pumping into the supplying power supply network, but which can be produced at lower cost than the pump circuits known from the prior art.

This object is achieved for a circuit of the type mentioned initially in that the energy storage capacitor is arranged in parallel with the output connections of the bridge rectifier, and the second connection of the at least one energy storage apparatus is connected to one of the two input connections of the bridge rectifier.

This circuit has the advantage that there is no need for the diodes denoted by DP1 and DP2, or DP1' and DP2' in the prior art. The omission of these diodes not only avoids the material price for the diodes, but also the associated assembly costs.

The solution according to the invention is based on the idea that the diodes DG1 to DG4 (which are present in any case) in the bridge rectifier can be used twice, to be precise firstly in their known function in the bridge rectifier and then, in addition, for the pumping process.

The energy storage apparatus may comprise at least one inductance and/or at least one capacitor. The actuation part of the actuation and load circuit may comprise an inverter. The said connection in the actuation and load circuit which, in operation, provides a signal at a considerably higher frequency than the AC voltage source, may be formed by the junction point between two electrical switches in the inverter.

In one particularly advantageous development, the circuit has a first energy storage apparatus which is connected to one of the two input connections of the bridge rectifier, and a second energy storage apparatus which is connected to the other input connection of the bridge rectifier. In this case, a plurality of energy storage apparatuses may be connected to the same connection in the actuation and load circuit, but each energy storage apparatus may also be connected to a different connection in the actuation and load circuit.

One particularly advantageous embodiment provides for the voltage at the at least one connection in the actuation and load circuit to be clamped to the voltage of the energy storage capacitor.

In a further advantageous embodiment, which applies the teaching disclosed by the same inventors in DE 199 14 505.9 to the present invention, the energy storage apparatus comprises an inductance and at least one capacitor, in which case the first connection of each capacitor is connected to the inductance, and its second connection is connected to one of the two input connections of the bridge rectifier, and the junction point between the inductance and each capacitor is connected via in each case one diode to the first and the second output connection of the bridge rectifier.

It is advantageous to provide at least one filter, in particular a low-pass filter, between the first and the second input connection of the bridge rectifier, which filter is arranged connected in series or parallel with the AC voltage source.

Further advantageous developments of the invention are defined in the independent claims.

The invention will be described in more detail in the following exemplary embodiments with reference to the attached drawings, in which:

DETAILED DESCRIPTION OF THE INVENTION

Figure 1:
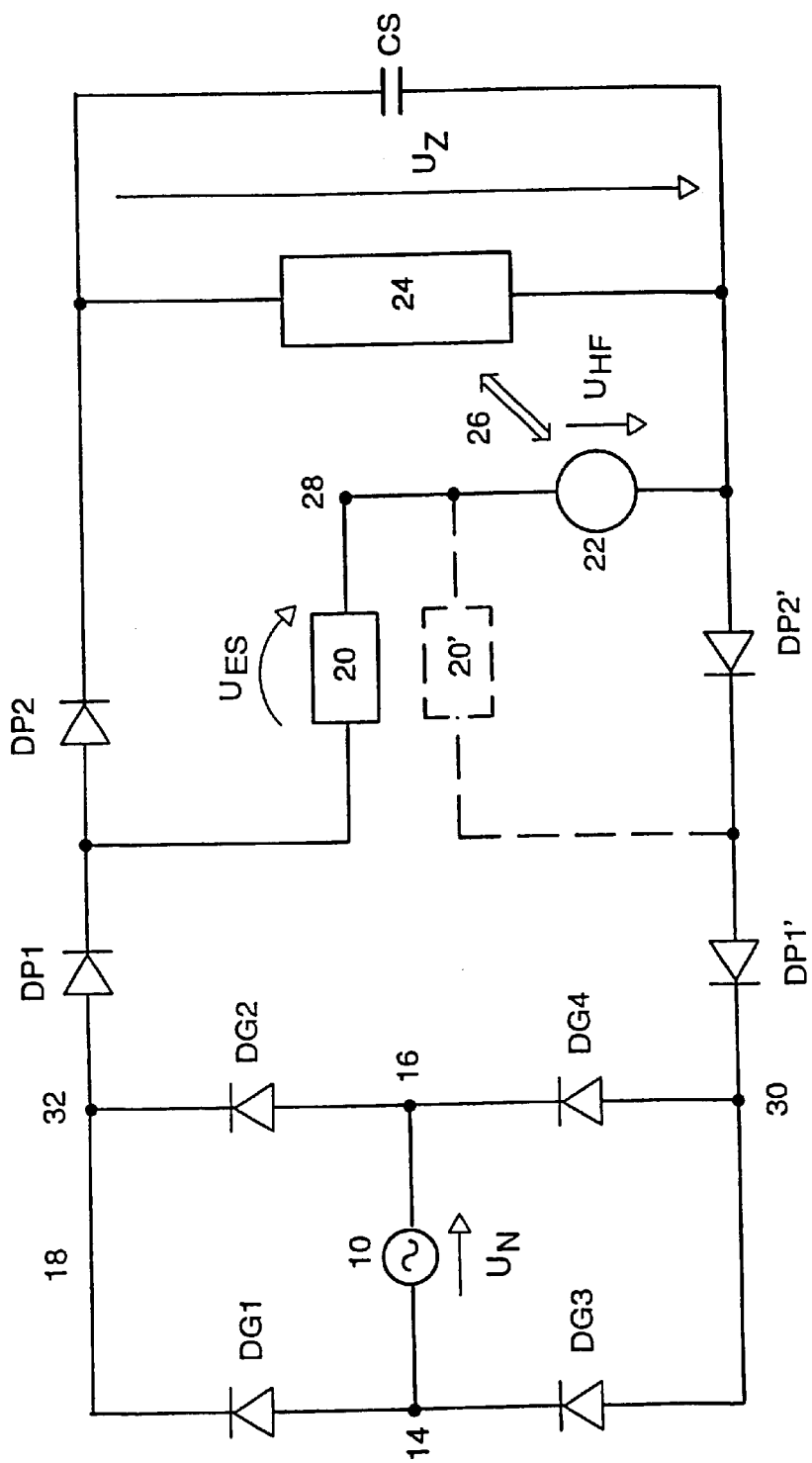
FIG. 1 shows a circuit from the prior art in order to illustrate the pump circuit principle.
Figure 2:
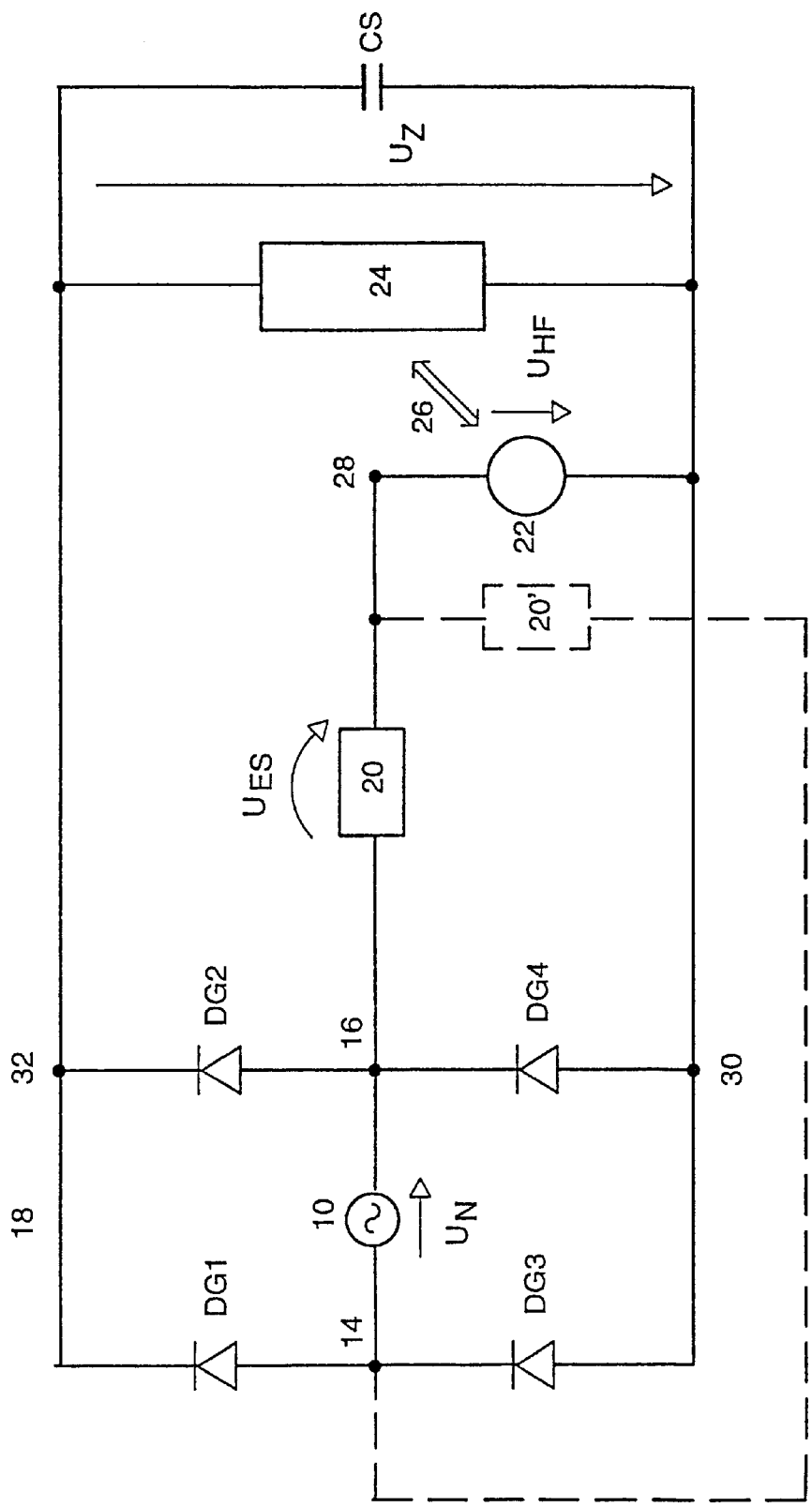
FIG. 2 shows an outline circuit to illustrate the pump circuit principle according to the invention.

FIG. 2 shows an outline circuit of a pump circuit according to the invention. In this case, components and assemblies which are the same as those in FIG. 1 are denoted by identical reference symbols. The embodiment illustrated by solid lines will be considered first of all: in contrast to the pump circuit shown in FIG. 1, the second connection of the energy storage apparatus 20 is now connected to the input connection 16 of the bridge rectifier 18, and the energy storage capacitor CS is connected in parallel with the output connections 30, 32 of the bridge rectifier 18. In the circuitry which is shown by dashed lines, which may be implemented additionally or as an alternative to the circuitry shown by solid lines, an energy storage apparatus 20' is connected to the other input connection 14 of the bridge rectifier 18. Those connections of the energy storage apparatuses 20, 20' which are in each case not connected to the bridge rectifier can, as shown, be connected to the same high-frequency voltage source 22. However, they may also be connected (not shown) to in each case one other high-frequency voltage source. In this context, that is to say in the field of pump circuits, the term high-frequency voltage source should be understood as meaning a connection point in a circuit at which a signal can be tapped off at a frequency which is considerably higher than that of the AC voltage source 10.

The following assumptions are made for the following analyses, in order to simplify understanding:

only the variant with the solid lines is considered.

Owing to the major difference in the frequencies of the voltage $U_N$ provided by the AC voltage source 10 and the voltage $U_{HF}$ provided by the AC voltage source 22, it is assumed for the sake of simplicity that $U_N$ is constant. Any change in $U_N$ may be taken into account by the case distinction $U_N<0$ or $U_N>0$ that is used in the following text. The following analysis thus investigates one period of $U_{HF}$, in which case it is assumed, as the initial point for the respective phase 1, $U_{HF}$ is just starting to fall.

The energy storage apparatus 20 is assumed to be a capacitor.

The voltage dropped across the energy storage apparatus 20, that is to say the capacitor, is assumed to be $U_{ES}$.

The voltage dropped across the energy storage capacitor CS is assumed to be $U_Z$.

Considering first of all Case A, for which it is assumed that $U_N<0$:

Phase 1: $U_{ES}+U_{HF}<-U_N$

A current is produced here which flows in the following network, AC voltage source 10, capacitor 20, high-frequency voltage source 22, diode DG3. Since $U_{ES}$ assumes the difference voltage in the circuit directly, the capacitor 20 is charged when $U_{HF}$ becomes less. In this case, energy flows from $U_N$ and $U_{HF}$ to the capacitor 20. This charging process continues until $U_{HF}$ has fallen to its minimum. When $U_{HF}$ is at its minimum $U_{ES}=U_N$. When $U_{HF}$ rises after passing through the minimum, the condition for Phase 1 is no longer satisfied, that is to say the diode DG3 is reverse-biased.

Phase 2: $U_Z>U_{ES}+U_{HF}>-U_N$

When the voltages that occur satisfy this condition, all the diodes are reverse-biased, that is to say no current flow takes place. Further increase in the voltage $U_{HF}$ leads to Phase 3: $U_Z<U_{ES}+U_{HF}$ This leads to the diode DG2 becoming forward-biased, that is to say a current flows in the network $-U_{ES}$, DG2, $U_Z$, $-U_{HF}$. In consequence, the capacitor 20 is discharged. The energy in this case flows from the capacitor 20 and $U_{HF}$ to the energy storage capacitor CS (for this analysis, CS may be assumed to be infinitely large).

$U_{HF}$ continues to rise to its maximum. The circuit then enters

Phase 4: $U_Z>U_{ES}+U_{HF}>-U_N$

Beyond the maximum of $U_{HF}$, the diode DG2 starts to become reverse-biased once again. All the diodes are thus reverse-biased in this stage, and no current flow takes place.

$U_{HF}$ then once again falls until Phase 1 starts again, see above.

In the following Case B, it is assumed that $U_N>0$:

Phase 1: $U_{ES}+U_{HF}<0$

A current flows in the network $U_{ES}$, $U_{HF}$, DG4 since, in this case, and in contrast to Case A, see above, the diode DG4 has started to become forward-biased first of all owing to the polarity of $U_N$. The capacitor 20 is in consequence charged from the high-frequency voltage source $U_{HF}$, that is to say energy flows from $U_{HF}$ to the capacitor 20.

$U_{HF}$ falls further to its minimum. The circuit is then in

Phase 2: $U_Z - U_N > U_{ES} + U_{HF} > 0$

In this stage, all the diodes are reverse-biased, and no current flow takes place.

$U_{HF}$ then rises. The circuit changes to

Phase 3: $U_Z - U_N < U_{ES} + U_{HF}$

Owing to the potential relationships at the annodes of DG1 and DG2, the diode DG1 becomes forward-biased more quickly. A current starts to flow in the network $U_{ES}, -U_N$, DG1, $U_Z$, $-U_{HF}$. In consequence, the capacitor 20 is discharged. Since $U_Z$ remains virtually unchanged owing to the large energy storage capacity CS, $U_{ES}$ falls as $U_{HF}$ rises. In this case, energy flows from $U_N$, $U_{HF}$, $U_{ES}$ to $U_Z$.

$U_{HF}$ then rises to its maximum. After passing through the maximum, the circuit is in Phase 4: $U_Z - U_N > U_{ES} + U_{HF} > 0$ In this stage, all the diodes are reverse-biased, and no current flow takes place.

$U_{HF}$ then falls further until the circuit enters Phase 1, see above. The diode DG4 then starts to become forward-biased once again, when $U_{HF}$ becomes greater than the voltage $U_{ES}$.

It is obvious to a person skilled in the art that the variant shown by dashed lines in FIG. 2, in which the second connection of an energy storage apparatus 20' is connected to the input connection 14 of the bridge rectifier 18, operates in a corresponding way.

With regard to the outline circuit shown in FIG. 2, the following text describes embodiments which all relate to the application of the circuit principle according to the invention in the case of ballasts for gas discharge lamps. As is obvious to a person skilled in the art, the circuit principle according to the invention may, however, also be applied in many other fields, so that the following embodiments cannot be regarded as representing any limitation.

Figure 3:
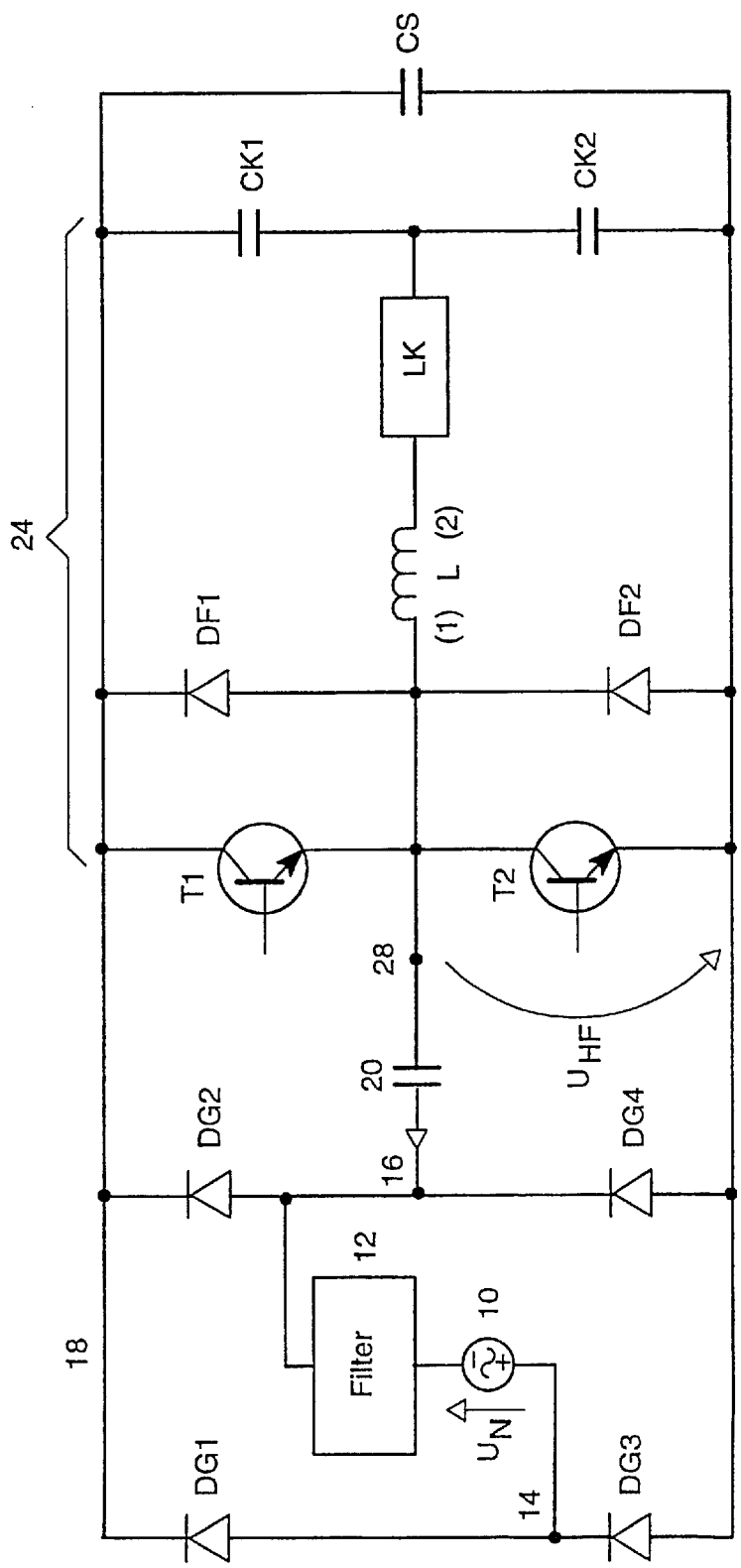
FIG. 3 shows a first embodiment of a circuit according to the invention having an energy storage apparatus.

FIG. 3 shows an embodiment in which the actuation and load circuit 24 comprises an inverter with two transistors T1, T2 whose actuation is indicated only schematically, as well as two freewheeling diodes DF1, DF2 connected back-to-back with them. An inductance L is connected on the one hand to the lamp circuit LK, and on the other hand to the junction point between the two transistors T1, T2 and the two freewheeling diodes DF1, DF2. The other connection of the lamp circuit LK is connected to the junction point between two coupling capacitors CK1, CK2, which are connected in parallel with the energy storage capacitor CS. The energy storage apparatus 20 is in the form of a capacitor. The AC voltage source 22 which is represented as a high-frequency voltage source $U_{HF}$ in the outline circuit in FIG. 2, is formed by the junction point 28 between the two transistors T1, T2 in the actuation and load circuit 24. The operating frequency of the two electrical switches T1, T2, which are operated in antiphase, is at a high frequency in comparison with the frequency of the AC voltage source 10, for example 50 kHz in comparison with 50 Hz, that is to say the two transistors are switched on alternately for approximately 10 µs in each case. That connection of the capacitor 20 which is not connected to the connection 28 is connected to the input connection 16 of the bridge rectifier 18.

Figure 4:
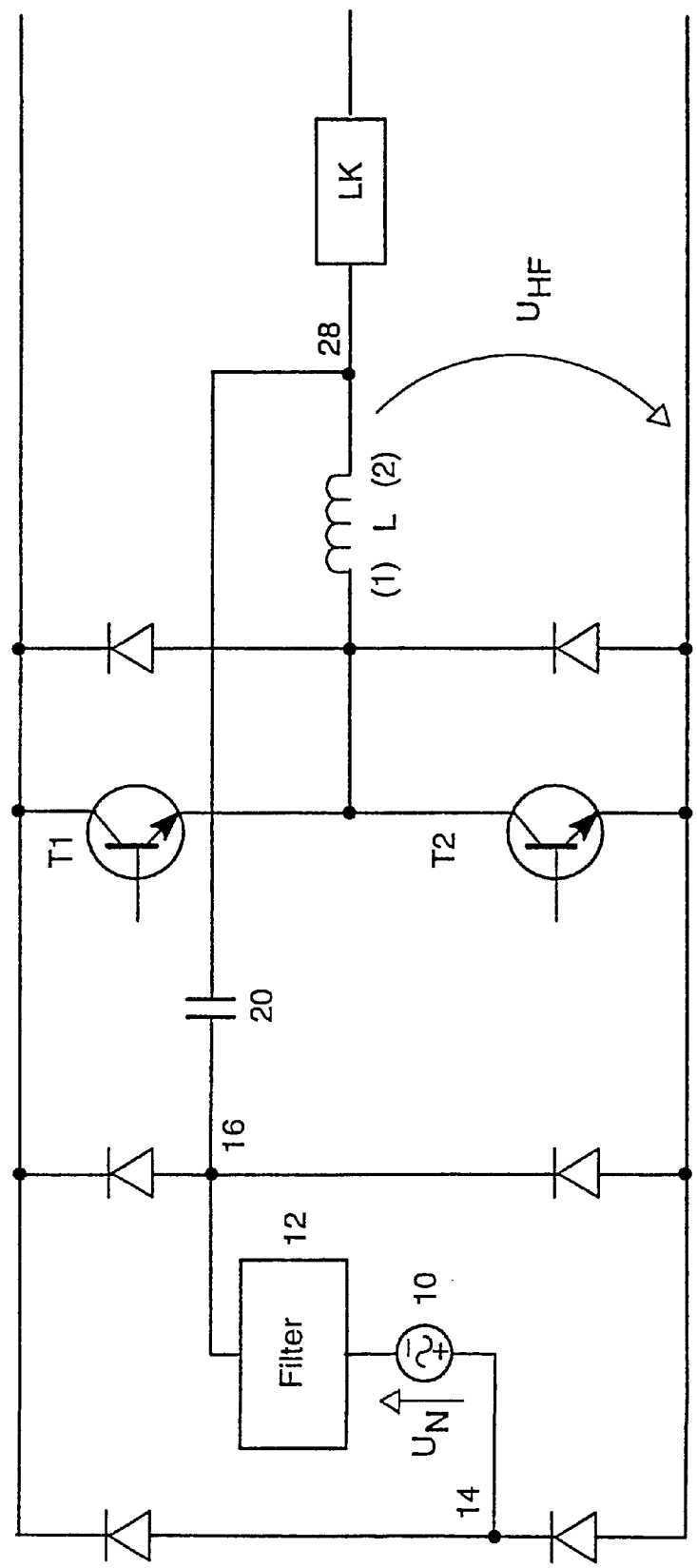
FIG. 4 shows an embodiment whose connection in the actuation and load circuit is modified from that in the embodiment in FIG. 3.

In the embodiment shown in FIG. 4, the capacitor 20 is connected on the one hand to the input connection 16 of the bridge rectifier 18 and on the other hand to the connection 28 which, in this embodiment, was chosen to be between the inductance L and the lamp circuit LK, since a high-frequency voltage for pumping energy can also be picked off at this point in the actuation and load circuit 24.

Figure 5:
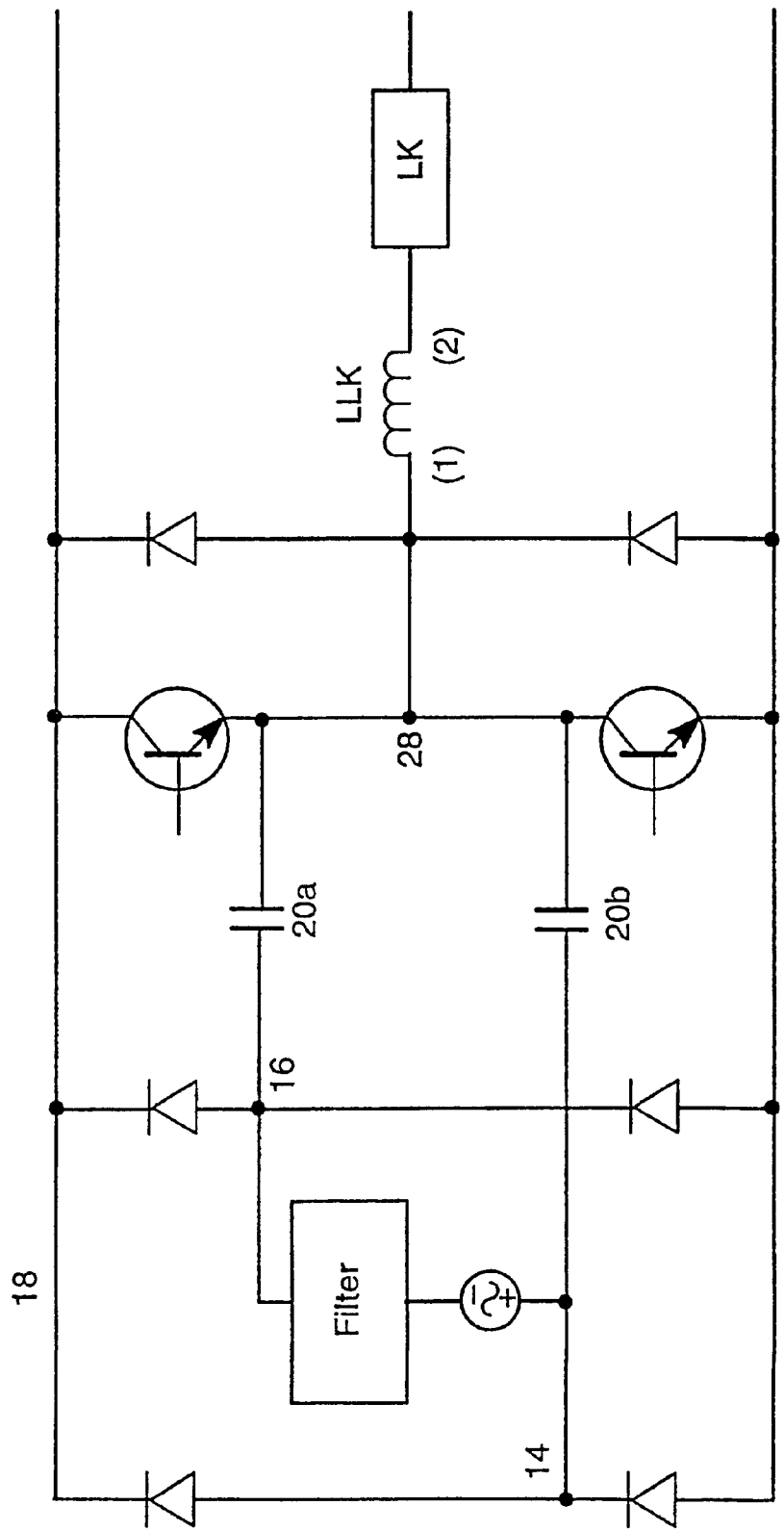
FIG. 5 shows an embodiment modified from that in FIG. 3, in which two energy storage apparatuses are provided.

FIG. 5 shows an embodiment having two energy storage apparatuses 20a, 20b, by way of example each in the form of a capacitor, in which case the one energy storage apparatus 20a is connected to the one input connection 16, and the other energy storage apparatus 20b is connected to the other input connection 14, of the bridge rectifier 18. The respective other connection of each of the two energy storage apparatuses is connected to a connection 28, which acts as a high-frequency voltage source.

Figure 6:
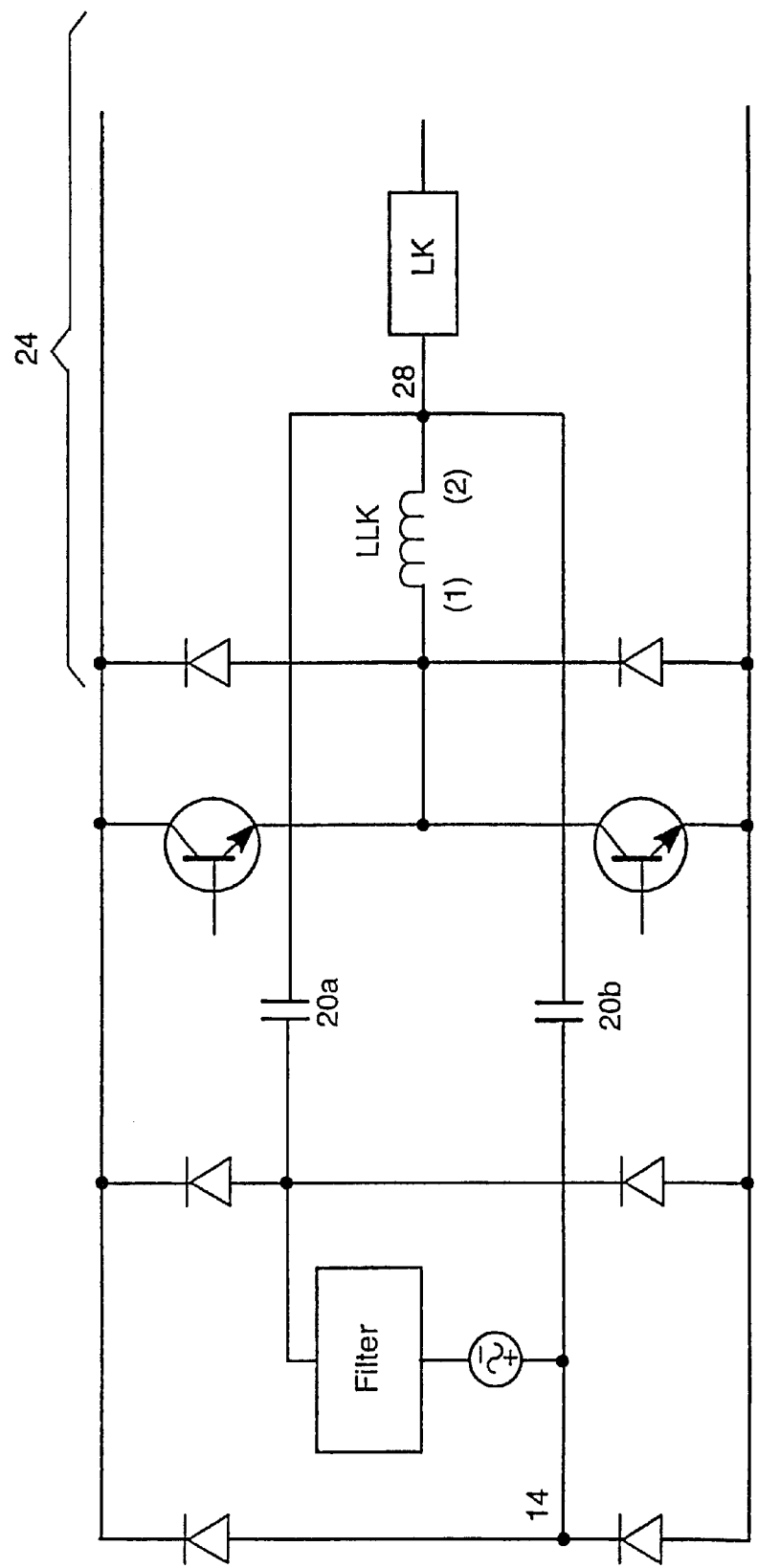
FIG. 6 shows an embodiment whose connection in the actuation and load circuit is modified from that in FIG. 5.

FIG. 6 shows a variation of the embodiment illustrated in FIG. 5, in which the two energy storage apparatuses 20a, 20b are connected to another high-frequency voltage source in the actuation and load circuit 24.

Figure 7:
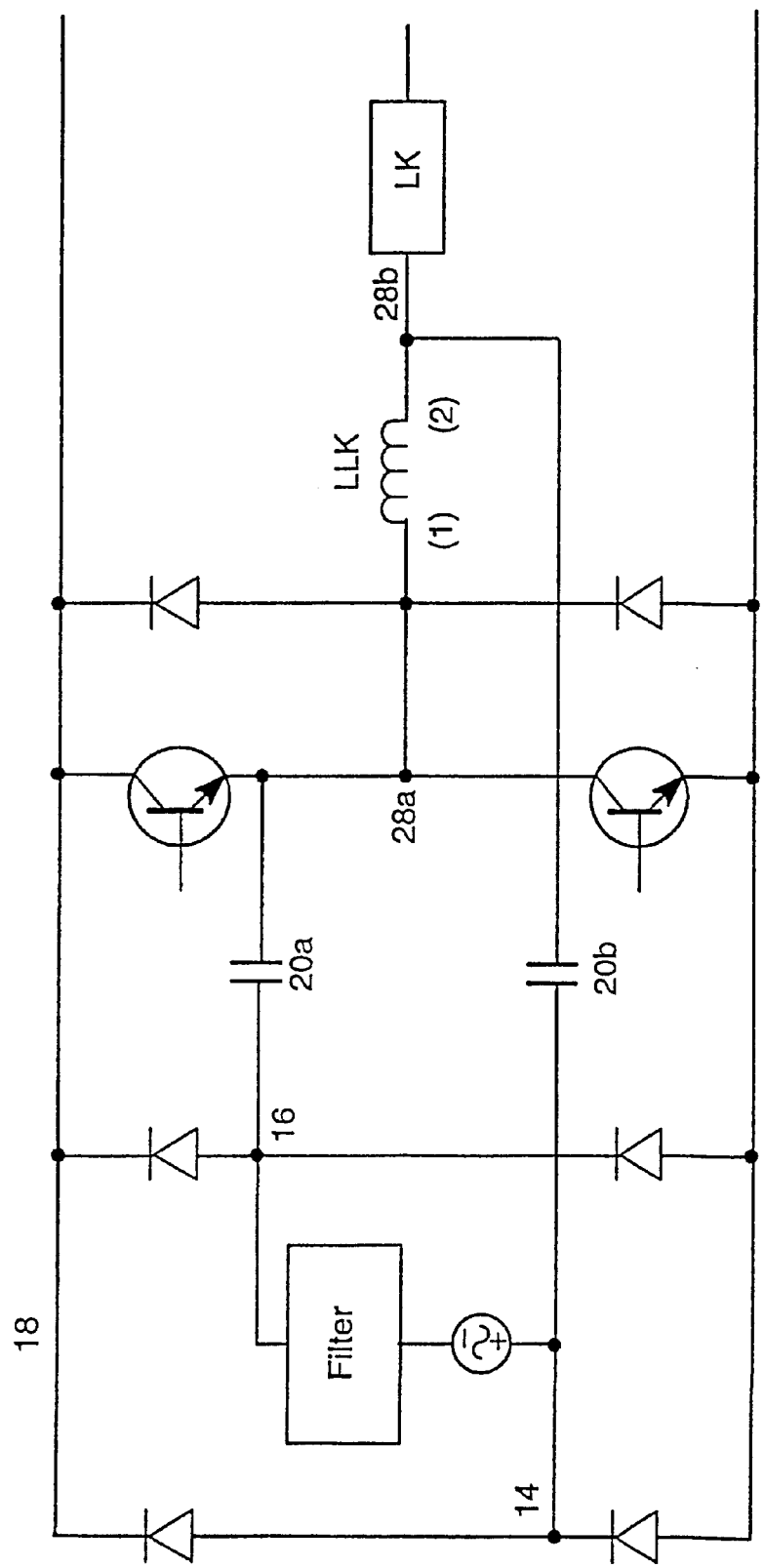
FIG. 7 shows an embodiment having two energy storage apparatuses, which are each connected to different points in the actuation and load circuit and to different inputs of the bridge rectifier.

FIG. 7 shows a further modification, in this case, the first energy storage apparatus 20a is connected to a connection 28a, which acts as a high-frequency voltage source, and the second energy storage apparatus 20b is connected to a connection 28b, which acts as a high-frequency voltage source. The respective other connection of the energy storage apparatuses 20a, 20b is connected to the input connection 16 or the input connection 14, respectively, of the bridge rectifier 18.

Figure 8:
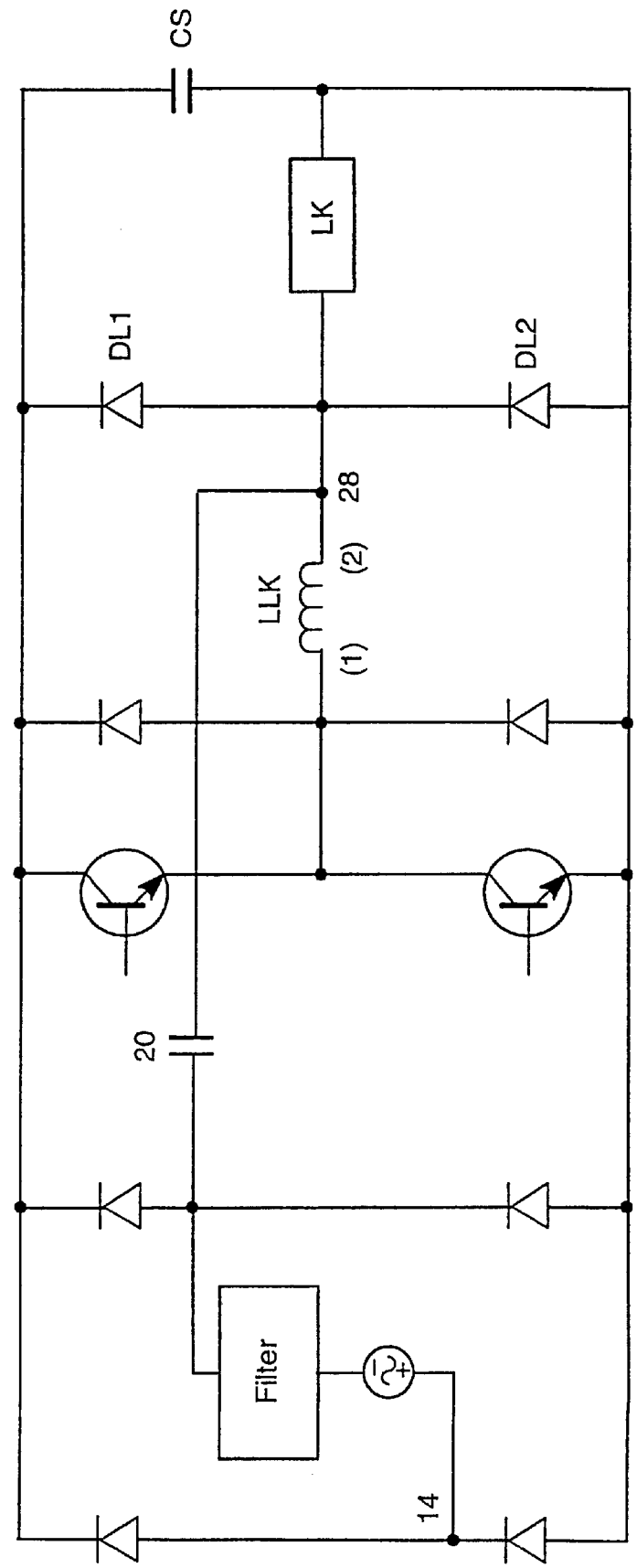
FIG. 8 shows an embodiment with two additional diodes for clamping the connection in the actuation and load circuit to the voltage of the energy storage capacitor.

FIG. 8 shows an embodiment which has been extended by the addition of two diodes DL1, DL2 in comparison with the embodiment shown in FIG. 4. This means that the high-frequency voltage of the connection 28 is clamped to the energy storage capacitor CS, thus precluding reactions from the load and maintaining a voltage at the connection 28 whose high-frequency amplitude is constant.

Figure 9:
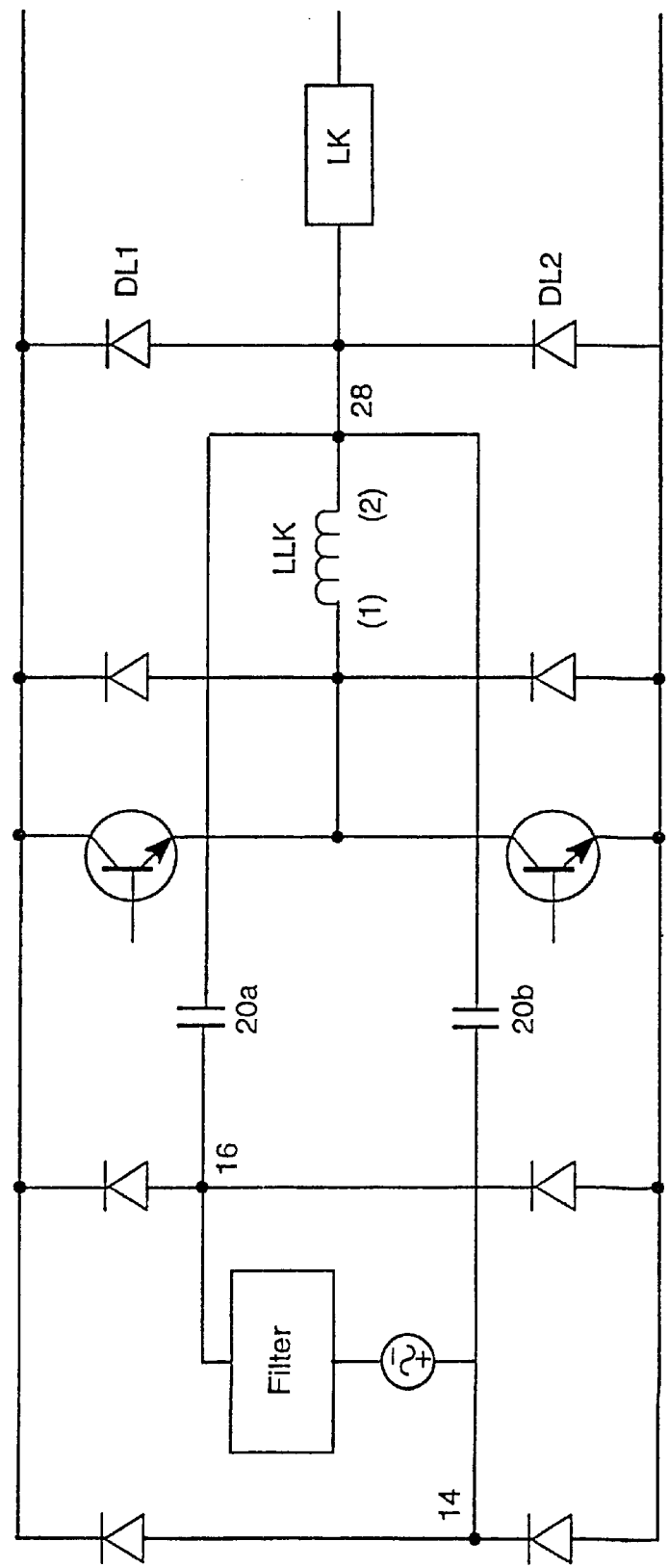
FIG. 9 shows an embodiment, which is modified from the embodiment shown in FIG. 8, having two energy storage apparatuses.

The variation illustrated in FIG. 9 of the embodiment shown in FIG. 8 once again has two energy storage apparatuses 20a, 20b, one connection of each of which is connected to the high-frequency voltage source at the connection 28, and whose respective other connection is connected on the one hand to the input connection 16, and on the other hand to the input connection 14, of the bridge rectifier.

Figure 10:
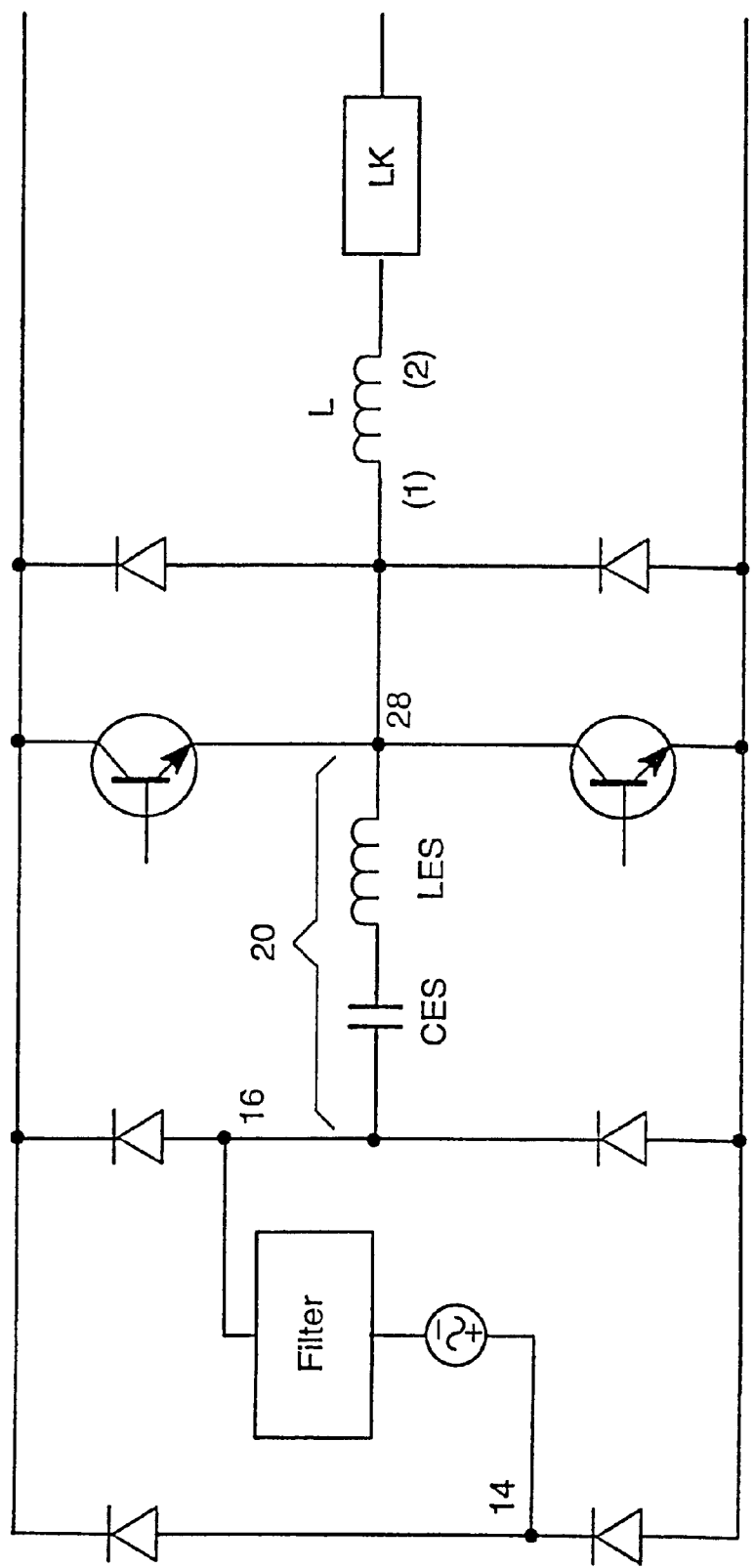
FIG. 10 shows an embodiment of the invention in which the energy storage apparatus comprises a capacitor and a coil.

FIG. 10 shows an embodiment in which the energy storage apparatus 20 comprises a series circuit formed by a capacitor CES and a coil LES.

Figure 11:
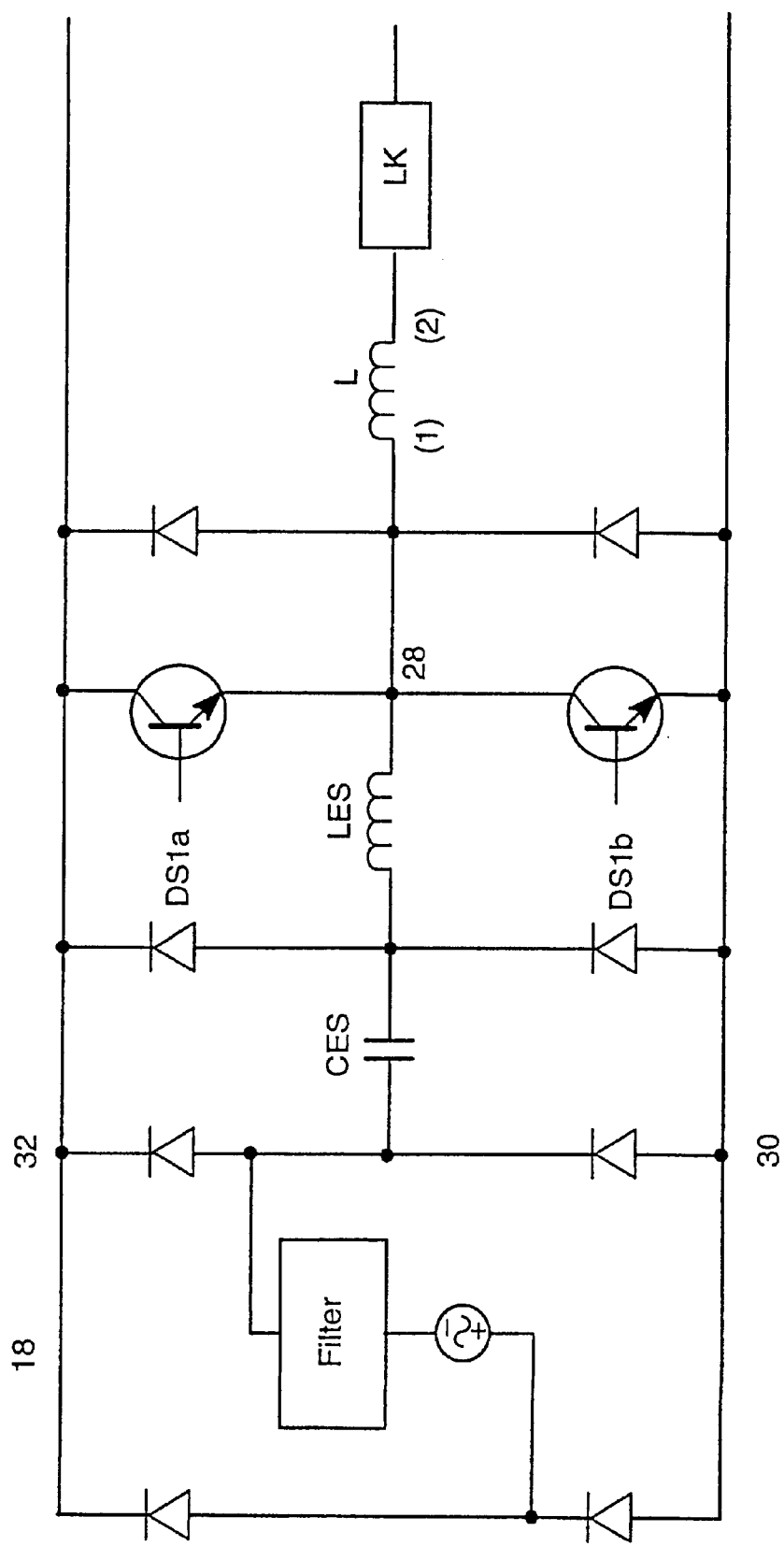
FIG. 11 shows an embodiment in which the energy storage apparatus likewise comprises an inductance and a capacitor, but in which two diodes are additionally provided.

FIG. 11 shows an embodiment in which, in comparison with the embodiment illustrated in FIG. 10, two diodes, DS1a, DS1b are connected to the junction point between the capacitor CES and the coil LES of the energy storage apparatus 20, the second connection of each of which diode is connected to the output connections 30, 32 of the bridge rectifier. This represents a combination of the invention described by the same inventors in DE 199 14 505.9 with the idea of the present invention. The statements in DE 199 14 505.9 are hereby also included by reference to the present disclosure.

Figure 12:
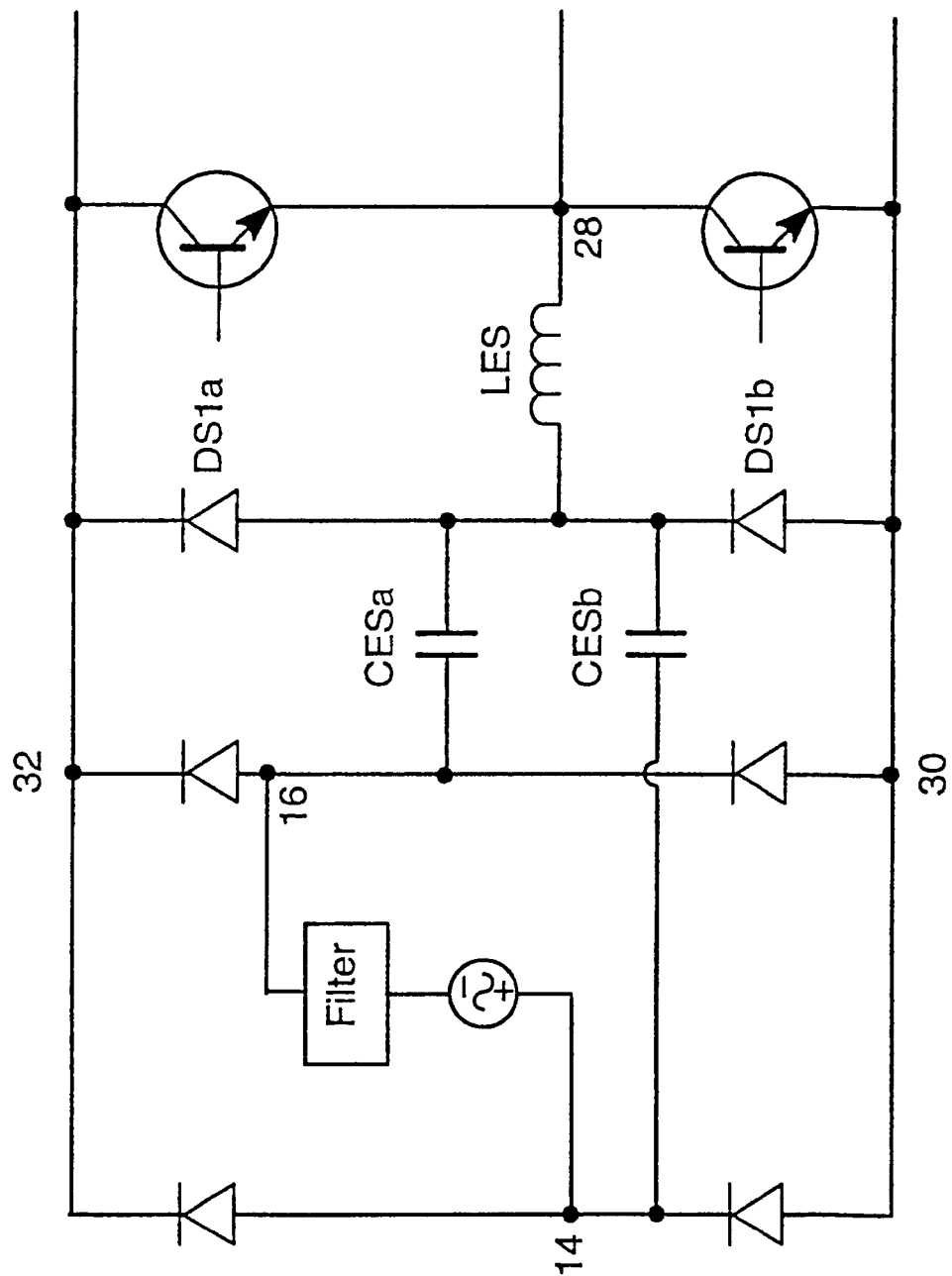
FIG. 12 shows an embodiment which is expanded from that in FIG. 11 by having a second capacitor, with the additional capacitor being connected to the other input of the bridge rectifier.

Since, in comparison with the embodiments in DE 199 14 505.9, the energy storage apparatus according to the present invention is directly connected to one of the input connections of the bridge rectifier 18, two diodes DS1a, DS1b are required in this case owing to the variation of the current flow direction through the coil LES. In the same way as illustrated in FIG. 3 of DE 199 14 505.9, the idea of the present invention can be extended to the situation where two energy storage apparatuses are used:

In FIG. 12, the energy storage apparatus comprises two capacitors CESa, CESb, which are each connected to a coil $L_{ES}$ which, for its part, is connected by its other connection to a connection 28 that acts as a high-frequency voltage source. The one capacitor CESa is connected by its connection facing away from the coil LES to the input connection 16, and the other capacitor CESb is connected by its connection facing away from the coil LES to the input connection 14 of the bridge rectifier 18. The junction point between the two capacitors CESa, CESb is connected by means of the coil LES and via two diodes DS1*a*, DS1*b* to the two output connections 30, 32 of the bridge rectifier 18.

In FIGS. 3 to 12, the AC voltage source 10 is in each case connected in series with a filter 12. The object of this filter 12 is, on the one hand, to prevent high-frequency energy being drawn from the AC voltage source 10 and, on the other hand, to prevent high-frequency signals from being fed into the AC voltage source. In one simple embodiment, the filter may be, for example, an inductor. As an alternative to this, or additionally, a filter may also be arranged in parallel with the AC voltage source 10, in which case it is possible to use a capacitor, for simplicity. Such a filter has no effect on the pumping principle of the pump circuits according to the invention.

It is obvious to a person skilled in the art that features of the individual embodiments can be combined to form further embodiments. It has been found to be particularly advantageous, at least, for the diodes DG1 and DG2 to be so-called "fast diodes".

What is claimed is:

1. A circuit for power-factor correction having
   a bridge rectifier (18) with a first and a second input connection (14, 16) in which case an AC voltage source (10) can be arranged between the first and the second input connection (14, 16), and having a first and a second output connection (30, 32),
   an actuation and load circuit (24),
   at least one energy storage apparatus, (20; 20*a*; 20*b*), whose first connection is connected to a connection (28) in the actuation and load circuit (24), in which case the signal which can be tapped off at this connection (28) in operation is at a considerably higher frequency than the output signal from the AC voltage source (10), and
   an energy storage capacitor ($C_s$),
   wherein
   the energy storage capacitor ($C_s$) is arranged in parallel with the output connections (30, 32) of the bridge rectifier (18), and
   the second connection of the at least one energy storage apparatus (20; 20*a*; 20*b*) is connected to one of the two input connections (14; 16) of the bridge rectifier (18).

2. The circuit as claimed in claim 1, wherein the energy storage apparatus (20; 20*a*; 20*b*) comprises at least one inductance (LES) and/or at least one capacitor (CES, CESa, CESb).

3. The circuit as claimed in claim 1, wherein the actuation part of the actuation and load circuit (24) comprises an inverter (T1 T2).

4. The circuit as claimed in claim 3, wherein the connection (28) in the actuation and load circuit (24) is formed by the junction point between two electrical switches (T1 T2) in the inverter.

5. The circuit as claimed in claim 1, wherein the circuit has a first energy storage apparatus (20*a*) which is connected to one of the two input connections (14; 16) of the bridge rectifier (18), and a second energy storage apparatus (20*b*) which is connected to the other input connection (16; 14) of the bridge rectifier (18).

6. The circuit as claimed in claim 1, wherein a plurality of energy storage apparatuses (20*a* 20*b*) are connected to the same connection (28) in the actuation and load circuit (24).

7. The circuit as claimed in one of claims 1, wherein each energy storage apparatus (20*a*, 20*b*) is connected to a different connection (28*a*, 28*b*) in the actuation and load circuit (24).

8. The circuit as claimed in claim 1, wherein the voltage at the connection (28) in the actuation and load circuit (24) is clamped to the voltage of the energy storage capacitor (CS).

9. The circuit as claimed in claim 1, wherein the energy storage apparatus comprises an inductance (LES) and at least one capacitor (CESa, CESb), in which case the first connection of each capacitor (CS, CESa, CESb) is connected to the inductance (LES), and its second connection is connected to one of the two input connections (14; 16) of the bridge rectifier (18), and the junction point between the inductance (LES) and each capacitor (CS, CESa, CESb) is connected via in each case one diode (DS1*a*, DS1*b*) to the first and the second output connection (30, 32) of the bridge rectifier (18).

10. The circuit as claimed in claim 1, wherein at least one filter (12), in particular a low-pass filter, is arranged, connected in series or parallel with the AC voltage source (10), between the first and the second input connection (14, 16) of the bridge rectifier (18).

11. The circuit as claimed in claim 1, wherein the circuit is part of a ballast for operation of gas-discharge lamps.

* * * * *